United States Patent
Bodas et al.

(10) Patent No.: US 9,307,427 B2
(45) Date of Patent: Apr. 5, 2016

(54) METHOD AND APPARATUS FOR USE OF A RELAY SCHEMED TO FACILITATE EFFICIENT BROADCAST COMMUNICATION IN DEVICE TO DEVICE ENVIRONMENT

(71) Applicant: QUALCOMM Incorporated, San Diego, CA (US)

(72) Inventors: Shreeshankar Bodas, Piscataway, NJ (US); Kapil Gulati, Long Branch, NJ (US); Shailesh Patil, Bridgewater, NJ (US); Saurabha R. Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 13/947,989

(22) Filed: Jul. 22, 2013

(65) Prior Publication Data

US 2015/0023185 A1    Jan. 22, 2015

(51) Int. Cl.
| | |
|---|---|
| *H04L 12/26* | (2006.01) |
| *H04W 24/08* | (2009.01) |
| *H04W 72/04* | (2009.01) |
| *H04L 5/00* | (2006.01) |
| *H04L 1/16* | (2006.01) |
| *H04L 1/18* | (2006.01) |
| *H04W 52/24* | (2009.01) |
| *H04W 52/28* | (2009.01) |

(Continued)

(52) U.S. Cl.
CPC .......... *H04W 24/08* (2013.01); *H04L 1/1692* (2013.01); *H04L 1/1825* (2013.01); *H04L 5/006* (2013.01); *H04W 52/245* (2013.01); *H04W 52/281* (2013.01); *H04W 52/383* (2013.01); *H04W 52/48* (2013.01); *H04W 72/0446* (2013.01)

(58) Field of Classification Search
USPC ......... 370/216, 241, 242, 243, 312, 315, 328, 370/390, 432, 458, 492, 501
See application file for complete search history.

(56) References Cited

U.S. PATENT DOCUMENTS

| | | | |
|---|---|---|---|
| 7,719,991 B2 | 5/2010 | Bhushan et al. | |
| 8,908,655 B2* | 12/2014 | Futagi et al. | 370/336 |
| 2003/0103521 A1* | 6/2003 | Raphaeli et al. | 370/445 |

(Continued)

FOREIGN PATENT DOCUMENTS

WO    2012133718 A1    10/2012

OTHER PUBLICATIONS

International Search Report and Written Opinion—PCT/US2014/046002—ISA/EPO—Oct. 8, 2014.

*Primary Examiner* — Kwang B Yao
*Assistant Examiner* — Nguyen Ngo
(74) *Attorney, Agent, or Firm* — Arent Fox LLP

(57) ABSTRACT

A method, an apparatus, and a computer program product for wireless communication are provided in connection with improving packet communication in a broadcast D2D communication system. In an example, a communications device is equipped to receive a first packet during a first timeslot from a broadcast transmitter, measure a power level of a NACK received during the first timeslot, receive the first packet during a second timeslot, and determine whether to transmit the first packet during the second timeslot based on the measured power level of the NACK. In such an aspect in which the communications device determines that the measured power level of the NACK is above a threshold power level, the communications device may act as a relay and transmit the first packet during the second timeslot.

40 Claims, 10 Drawing Sheets

(51) Int. Cl.
*H04W 52/38* (2009.01)
*H04W 52/48* (2009.01)

(56) References Cited

U.S. PATENT DOCUMENTS

| | | | |
|---|---|---|---|
| 2006/0056343 A1* | 3/2006 | Hu et al. | 370/329 |
| 2006/0133290 A1 | 6/2006 | Lindoff et al. | |
| 2008/0222478 A1* | 9/2008 | Tamaki | 714/749 |
| 2010/0303000 A1* | 12/2010 | Shiizaki et al. | 370/315 |
| 2010/0309021 A1 | 12/2010 | Picard | |
| 2011/0158295 A1* | 6/2011 | Shiizaki | 375/211 |
| 2012/0028672 A1* | 2/2012 | Chen et al. | 455/522 |
| 2012/0087294 A1* | 4/2012 | Higuchi et al. | 370/312 |
| 2012/0163252 A1* | 6/2012 | Ahn et al. | 370/280 |
| 2012/0188924 A1 | 7/2012 | Yeh et al. | |
| 2012/0230370 A1 | 9/2012 | Shaffer et al. | |
| 2012/0327760 A1* | 12/2012 | Du et al. | 370/216 |
| 2013/0040557 A1* | 2/2013 | Shiizaki et al. | 455/7 |
| 2013/0089020 A1* | 4/2013 | Hakola et al. | 370/312 |
| 2014/0171062 A1* | 6/2014 | Fallgren et al. | 455/422.1 |
| 2014/0185587 A1* | 7/2014 | Jang et al. | 370/331 |
| 2014/0328329 A1* | 11/2014 | Novlan et al. | 370/336 |

* cited by examiner

METHOD AND APPARATUS FOR USE OF A RELAY SCHEMED TO FACILITATE EFFICIENT BROADCAST COMMUNICATION IN DEVICE TO DEVICE ENVIRONMENT

BACKGROUND

1. Field

The present disclosure relates generally to communication systems, and more particularly, to communication of content from a broadcasting user equipment (UE) in a broadcast device to device (D2D) communication system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is LTE. LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication.

In a broadcast D2D communication system, there may be a single transmitter UE broadcasting to multiple broadcast receiver UEs with the objective of the broadcast transmitter UE being to ensure that every packet is received by at least a fraction of intended receiver UEs (e.g., 90%). The intended receivers may send negative acknowledgements (NACKs) signal when they have not received the packet, and optionally, may send acknowledgement (ACK) signals when they receive the packet. Where a percentage of the intended receiver UEs send NACK signals, then the broadcast transmitter UE may continue to transmit the same packet. As such, system performance is at least partially dependent upon the maximum pathloss between the broadcast transmitter UE and the intended receiver UEs (e.g., receiver(s) with poor channel conditions may take comparatively longer to receive a packet). The repeated transmission of the same packet reduces system throughput as well as the throughput for that particular broadcast session.

As such, a system and method to improve packet communication in a broadcast D2D communication system may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving packet communication in a broadcast D2D communication system. In an example, a communications device is equipped to receive a first packet during a first timeslot from a broadcast transmitter, measure a power level of a NACK received during the first timeslot, receive the first packet during a second timeslot, and determine whether to transmit the first packet during the second timeslot based on the measured power level of the NACK. In such an aspect in which the communications device determines that the measured power level of the NACK is above a threshold power level, the communications device may act as a relay and transmit the first packet during the second timeslot.

According to related aspects, a method for improving packet communication in a broadcast D2D communication system is provided. The method can include receiving, by a UE, a first packet during a first timeslot from a broadcast transmitter. Further, the method can include measuring a power level of a NACK received during the first timeslot. Further, the method can include receiving the first packet during a second timeslot. Moreover, the method may include determining whether to transmit the first packet during the second timeslot based on the measured power level of the NACK.

Another aspect relates to a communications apparatus enabled to improve packet communication in a broadcast D2D communication system. The communications apparatus can include means for receiving, by a UE, a first packet during a first timeslot from a broadcast transmitter. Further, the communications apparatus can include means for measuring a power level of a NACK received during the first timeslot. Further, the communications apparatus means for receiving may be configured to receive the first packet during a second timeslot. Moreover, the communications apparatus can include means for determining whether to transmit the first packet during the second timeslot based on the measured power level of the NACK.

Another aspect relates to a communications apparatus. The apparatus can include a processing system configured to receive, by a UE, a first packet during a first timeslot from a broadcast transmitter. Further, the processing system may be configured to measure a power level of a NACK received during the first timeslot. Further, the processing system may be configured to receive the first packet during a second timeslot. Moreover, the processing system may further be configured to determine whether to transmit the first packet during the second timeslot based on the measured power level of the NACK.

Still another aspect relates to a computer program product, which can have a computer-readable medium including code for receiving, by a UE, a first packet during a first timeslot from a broadcast transmitter. Further, the computer-readable medium may include code for measuring a power level of a NACK received during the first timeslot. Further, the computer-readable medium may include code for receiving the first packet during a second timeslot. Moreover, the computer-readable medium can include code for determining whether to transmit the first packet during the second timeslot based on the measured power level of the NACK.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
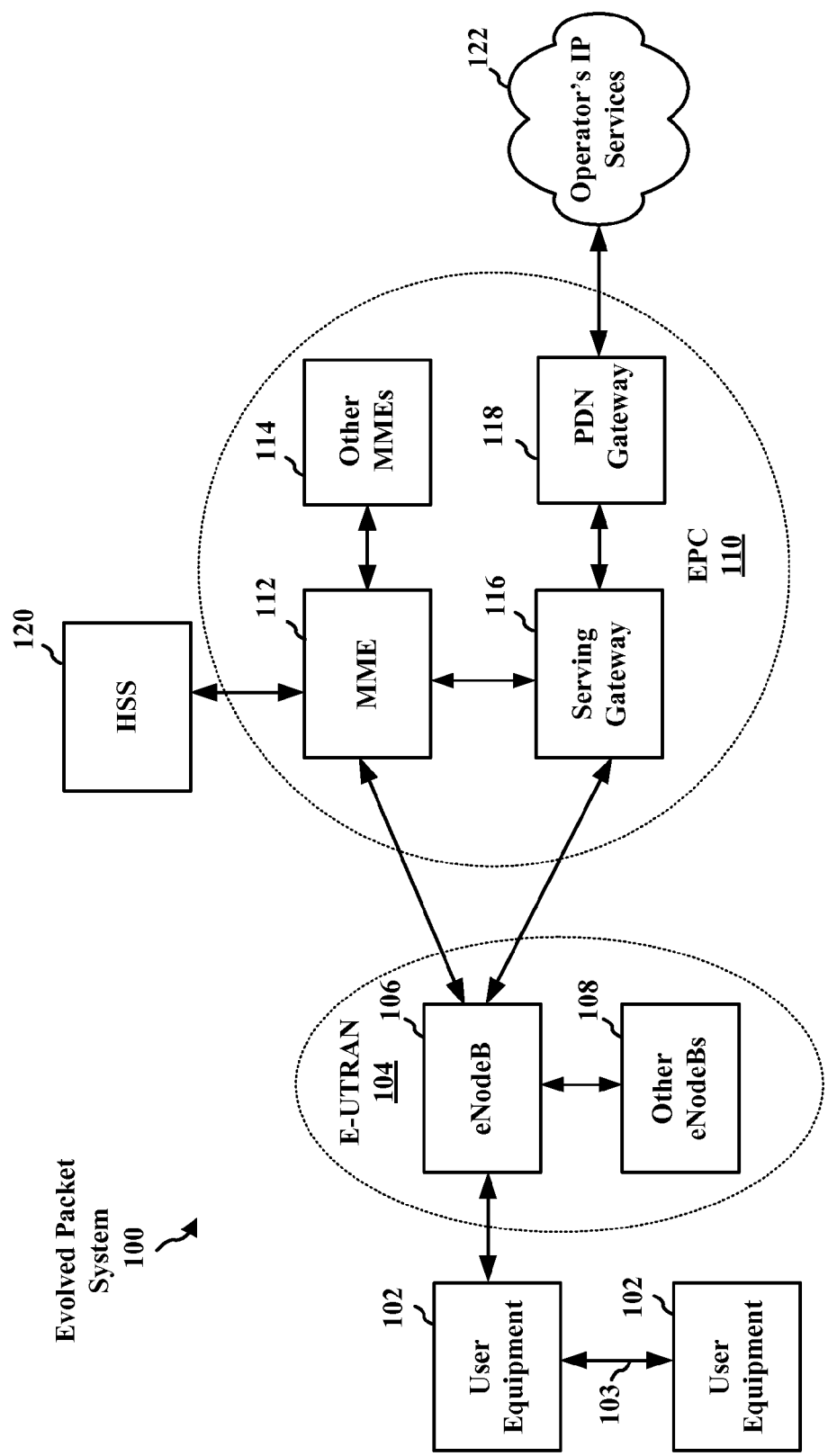
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The UEs 102 may form a D2D connection 103. In an aspect, the D2D connection 103 may be configured to allow the UEs 102 to communicate with each other. In another aspect, a UE 102 may act as a leader of a group of UEs that are able to communicate with each other using the D2D connection 103. Examples of D2D connection 103 are provided with reference to IEEE 802.11p based communications. IEEE 802.11p based dedicated short range communications (DSRC) wave systems provide a basic safety message format where devices (e.g., vehicles) periodically may announce their position, velocity and other attributes to other devices (e.g., other vehicles) allowing the neighboring traffic to track their positions and avoid collisions, improve traffic flow, etc. Further, the communication protocols in these systems do not preclude pedestrians (with their user equipment (UEs)) from utilizing this spectrum and periodically transmitting the basic safety messages which can indicate information such as their presence to vehicles around them.

The eNB 106 is connected by an Si interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
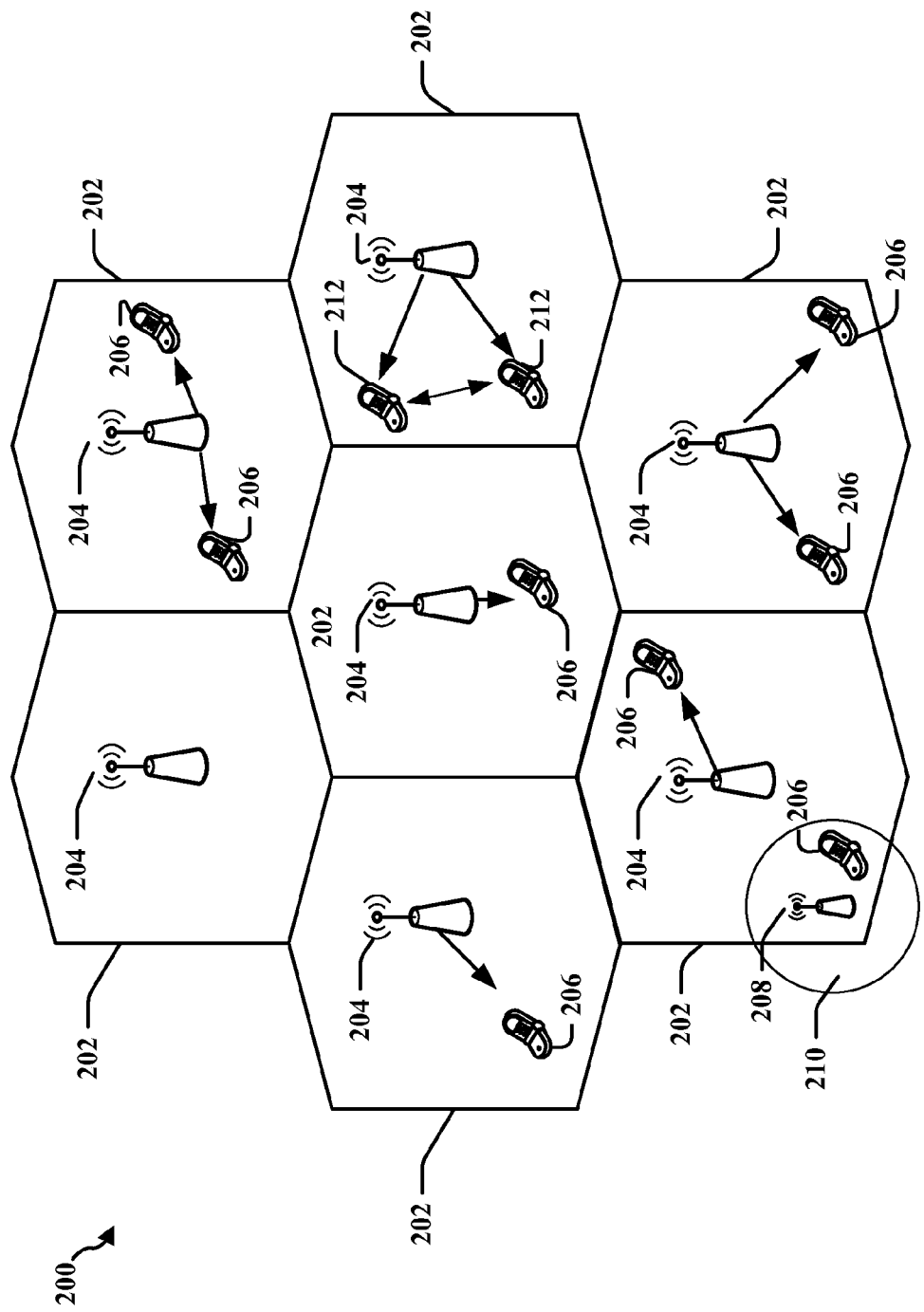
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
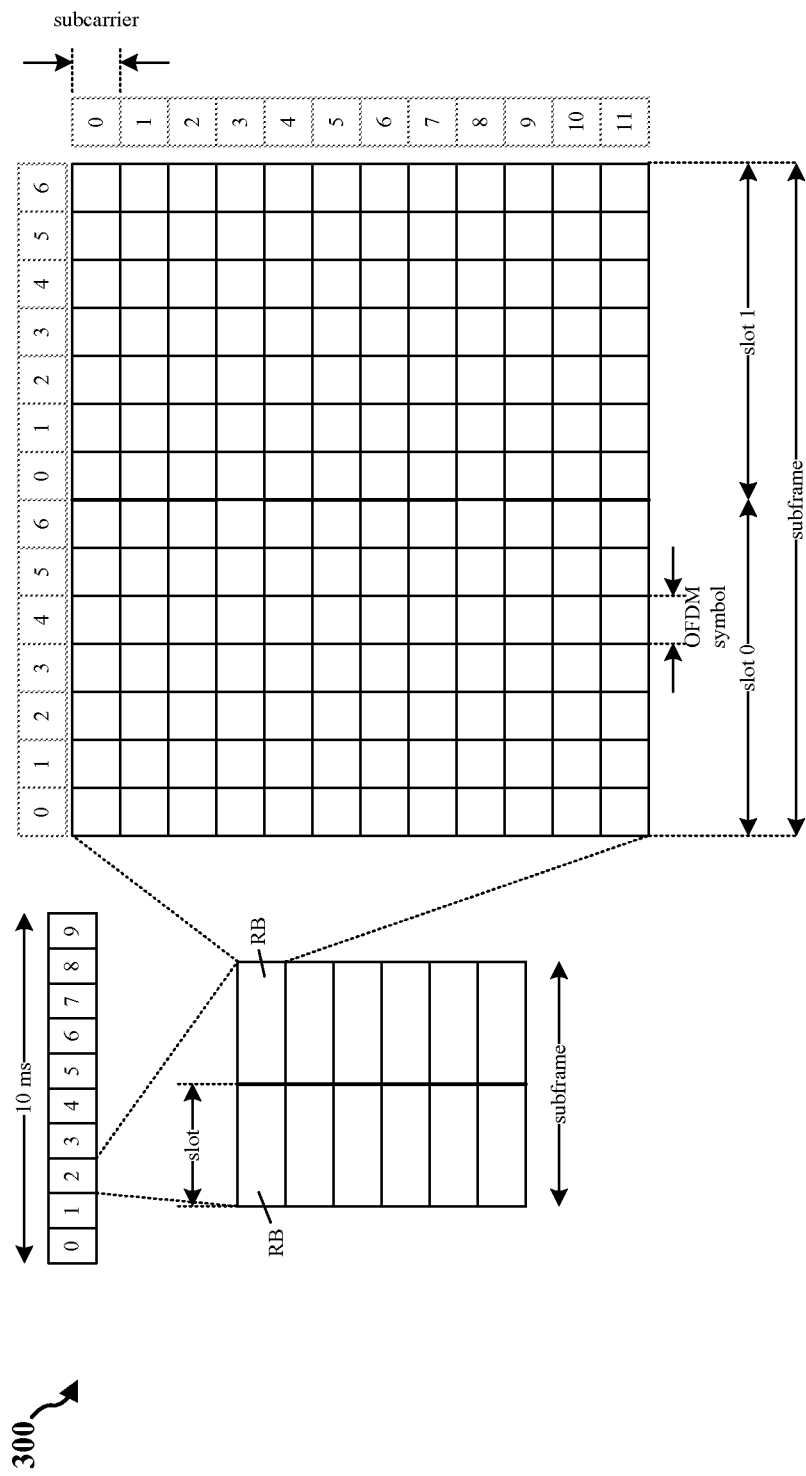
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
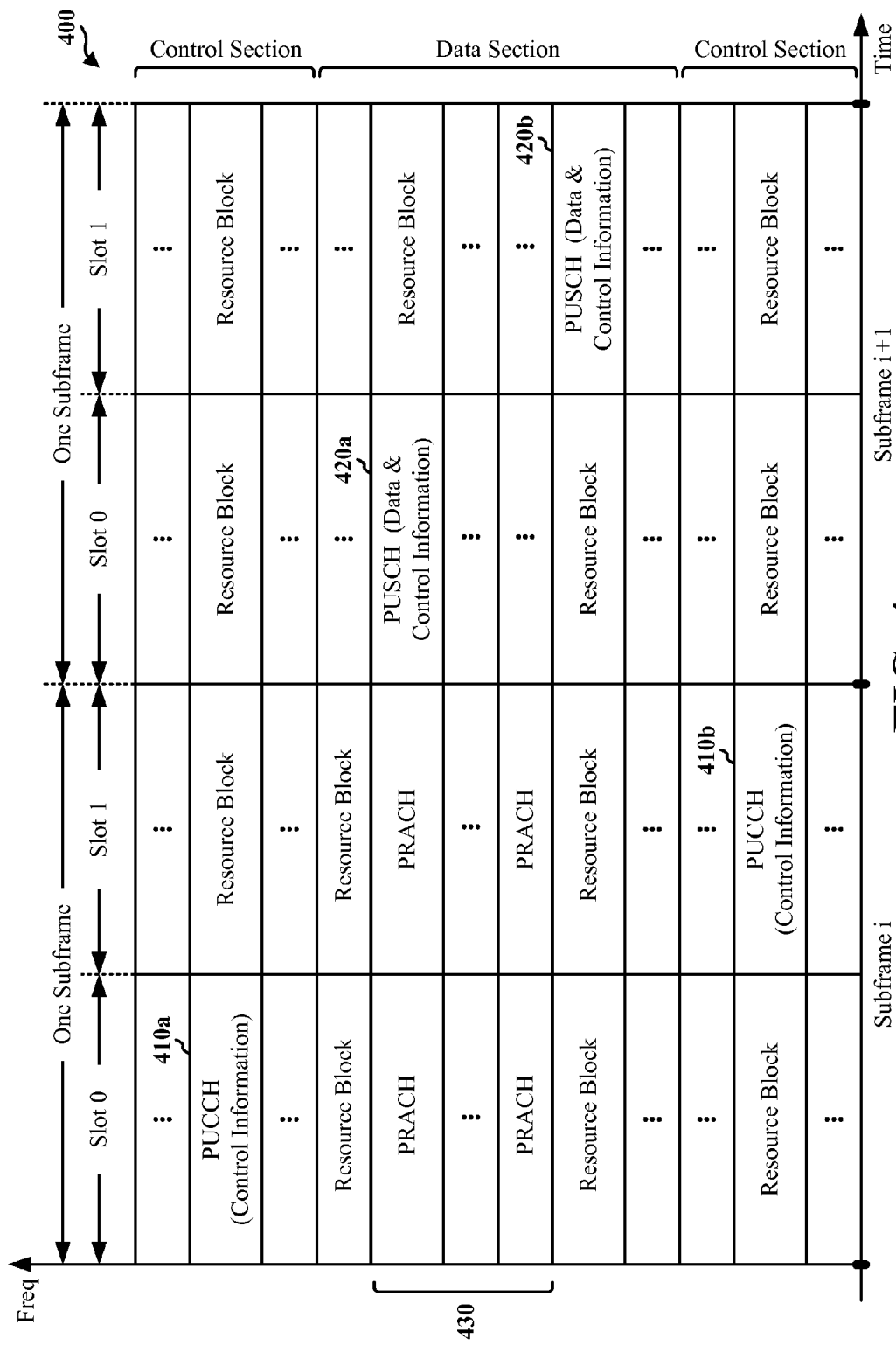
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
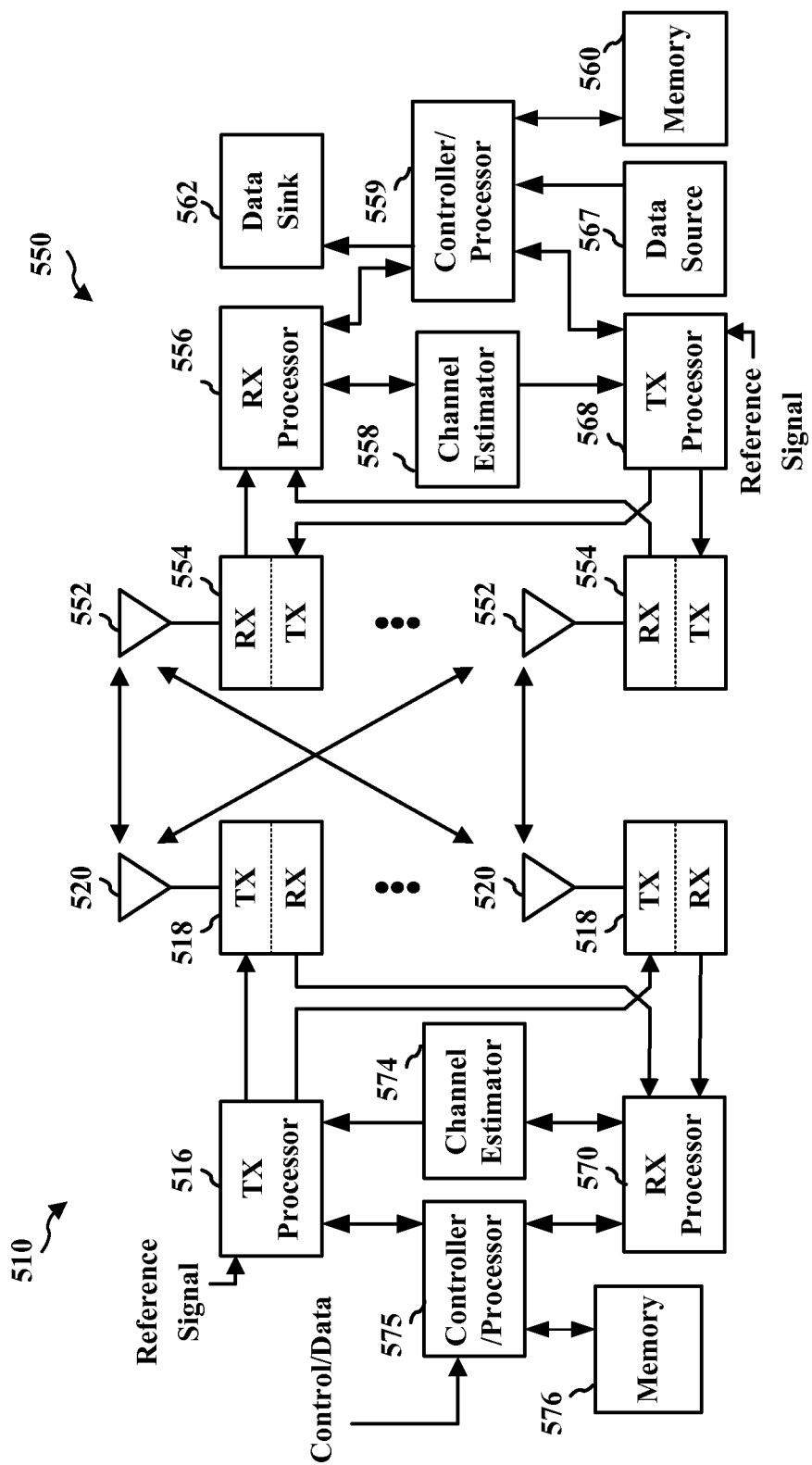
FIG. 5 is a diagram illustrating an example of an evolved Node B and user equipment in an access network.

FIG. 5 is a block diagram of an eNB 510 in communication with a UE 550 in an access network. In the DL, upper layer packets from the core network are provided to a controller/processor 575. The controller/processor 575 implements the functionality of the L2 layer. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The transmit (TX) processor 516 implements various signal processing functions for the L1 layer (i.e., physical layer). The signal processing functions includes coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates an RF carrier with a respective spatial stream for transmission.

At the UE 550, each receiver 554RX receives a signal through its respective antenna 552. In another aspect, UE 550 may communicate with other UEs similarly to how UE 550 communicates with eNB 510. Each receiver 554RX recovers information modulated onto an RF carrier and provides the information to the receive (RX) processor 556. The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 510. These soft decisions may be based on channel estimates computed by the channel estimator 558. The soft decisions are then decoded and deinterleaved to recover the data and control signals that were originally transmitted by the eNB 510 on the physical channel. The data and control signals are then provided to the controller/processor 559.

The controller/processor 559 implements the L2 layer. The controller/processor can be associated with a memory 560 that stores program codes and data. The memory 560 may be referred to as a computer-readable medium. In the UL, the controller/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the UL, a data source 567 is used to provide upper layer packets to the controller/processor 559. The data source 567 represents all protocol layers above the L2 layer. Similar to the functionality described in connection with the DL transmission by the eNB 510, the controller/processor 559 implements the L2 layer for the user plane and the control plane by providing header compression, ciphering, packet segmentation and reordering, and multiplexing between logical and transport channels based on radio resource allocations by the eNB 510. The controller/processor 559 is also responsible for HARQ operations, retransmission of lost packets, and signaling to the eNB 510.

Channel estimates derived by a channel estimator 558 from a reference signal or feedback transmitted by the eNB 510 may be used by the TX processor 568 to select the appropriate coding and modulation schemes, and to facilitate spatial processing. The spatial streams generated by the TX processor 568 are provided to different antenna 552 via separate transmitters 554TX. Each transmitter 554TX modulates an RF carrier with a respective spatial stream for transmission.

The UL transmission is processed at the eNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 may implement the L1 layer.

The controller/processor 575 implements the L2 layer. The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover upper layer packets from the UE 550. Upper layer packets from the controller/processor 575 may be provided to the core network. The controller/processor 575 is also responsible for error detection using an ACK and/or NACK protocol to support HARQ operations.

Figure 6:
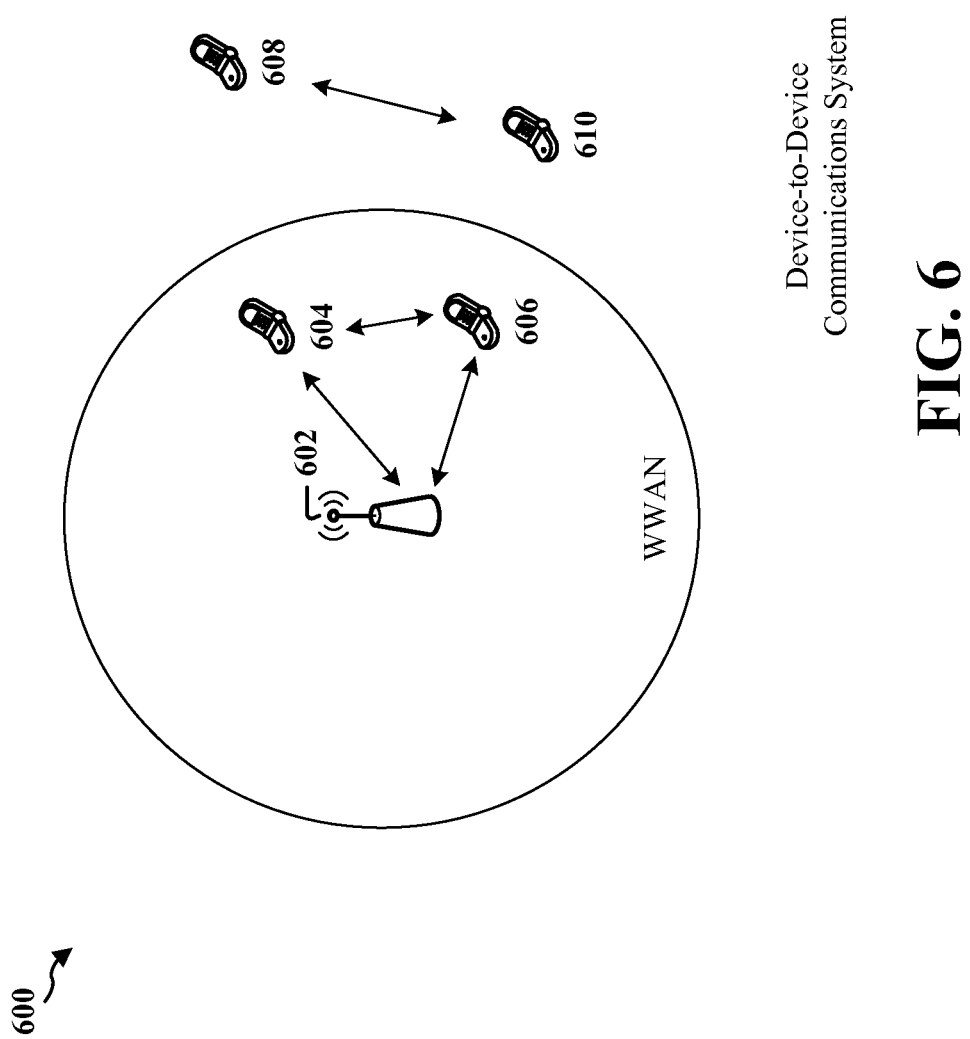
FIG. 6 is a diagram illustrating a device-to-device communications network.

FIG. 6 is a diagram of a device-to-device communications system 600. The device-to-device communications system 600 includes a plurality of wireless devices 604, 606, 608, 610. The device-to-device communications system 600 may overlap with a cellular communications system, such as for example, a wireless wide area network (WWAN). Some of the wireless devices 604, 606, 608, 610 may communicate together in device-to-device communication using the DL/UL WWAN spectrum, some may communicate with the base station 602, and some may do both. For example, as shown in FIG. 6, the wireless devices 608, 610 are in device-to-device communication and the wireless devices 604, 606 are in device-to-device communication. The wireless devices 604, 606 are also communicating with the base station 602.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on Flash-LinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 7:
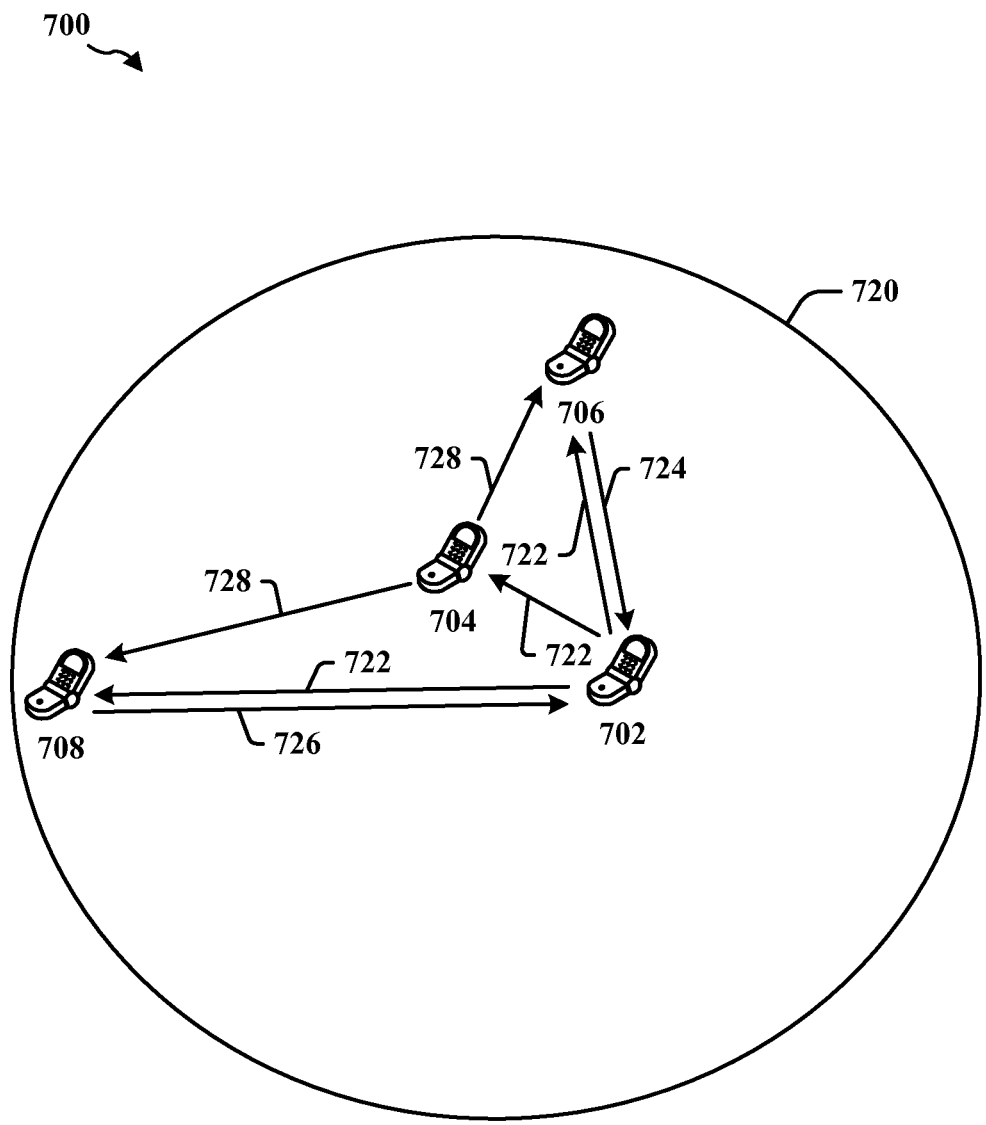
FIG. 7 is a diagram illustrating a device-to-device communications network that is configured to improve packet communication in a broadcast D2D communication system, according to an aspect.

FIG. 7 is a diagram of a communications system 700 that is configured to support broadcast D2D communications.

In an aspect, multiple UEs (e.g., 702-708) may form a group of UEs 720. In such an aspect, a UE 702 of the group of UEs 720 may act as a broadcaster UE in the broadcast D2D communications system 700. In an operational aspect, broadcasting UE 702 may broadcast content 722 to the other UEs in the group of UEs 720 in the broadcast D2D communications system 700. Each UE (e.g., 704-708) may attempt to decode the received content 722. Where a UE (e.g., 706, 708) is unable to decode the received content 722, the UE(s) (706, 708) may transmit NACK(s) (724, 726) to the broadcasting UE 702. In such an operational aspect in which a sufficient number, percentage, etc., of the UEs in the group of UEs 720 transmit NACKs, then the broadcasting UE 702 retransmits the content 722.

In an aspect, a UE 704 that has successfully received the content 722 may decide whether to act as a relay upon receiving a second instance of the content. Where the UE 704 acts as a relay, it may broadcast an instance of the content 728 so as to allow the other UEs (706, 708) a greater chance of successfully decoding the content (722, 728).

Once a receiver UE (e.g., UE 704) in a broadcast session has successfully received a packet (e.g., content 722), the UE 704 has the potential to become a relay for that packet. If in the next (or any subsequent) timeslot the broadcasting UE 702 transmits the same packet, then the receiver UE may also transmit the same packet. For example, where the NACK power is "low" (e.g., compared to a threshold), then the UE may not act as a relay for the first packet during the second timeslot. While where the measured NACK power is high, (e.g., compared to the threshold), then the UE may act as a relay for the first packet during the second timeslot (e.g., timeslot T+1). This received power (e.g., NACK, ACK, etc.) based decision allows the UE to determine when transmission of the first packet would be useful in the network. For example, a NACK from a nearby node may be received with a high power, thus making relaying at low power useful, which also does not cause much interference to the other nodes.

In an aspect, the UE may act as a passive relay or an active relay. Where the UE acts as a passive relay, the packet is transmitted without sending a request to send (RTS) signal. Where the UE acts as an active relay, the UE may transmit a RTS signal. In such an aspect, the RTS signal may be sent on the same control resource as the original broadcast transmitter, or a different resource. Further, where the UE transmits the RTS, it may use the received power level from any cleat-to-send (CTS) messages it receives to assist in determining whether to act as a relay. Additionally, the transmit power used by the UE may be based at least in part of the measurements power levels (NACK, ACK, CTS, etc.). Further, the broadcast D2D communication system may allocate different priority levels to different members (e.g., UEs). In such an aspect, the relay UE may treat itself to be of the "lowest" priority and choose small enough transmit power so as not to cause too much interference to any of the other (unicast or broadcast or any other) links. Further, in such an aspect, the UE transmit power may be decided based on the CTS powers received and a comparison threshold. In another aspect, the relay UE can treat itself to be of the same priority as its own broadcast transmitter and choose a power that does not cause too much interference only to the higher priority communication links (e.g., the UE may cause interference to the lower priority links). In other words, the relay UE may select a priority value than can be the highest priority in the system, or any other value between the lowest and the highest depending upon the ACK/NACK, CTS powers, the original broadcast transmitter's priority, etc. Further, in such an aspect, the UE transmit power may be decided based on the CTS powers received and a comparison threshold.

Figure 8:
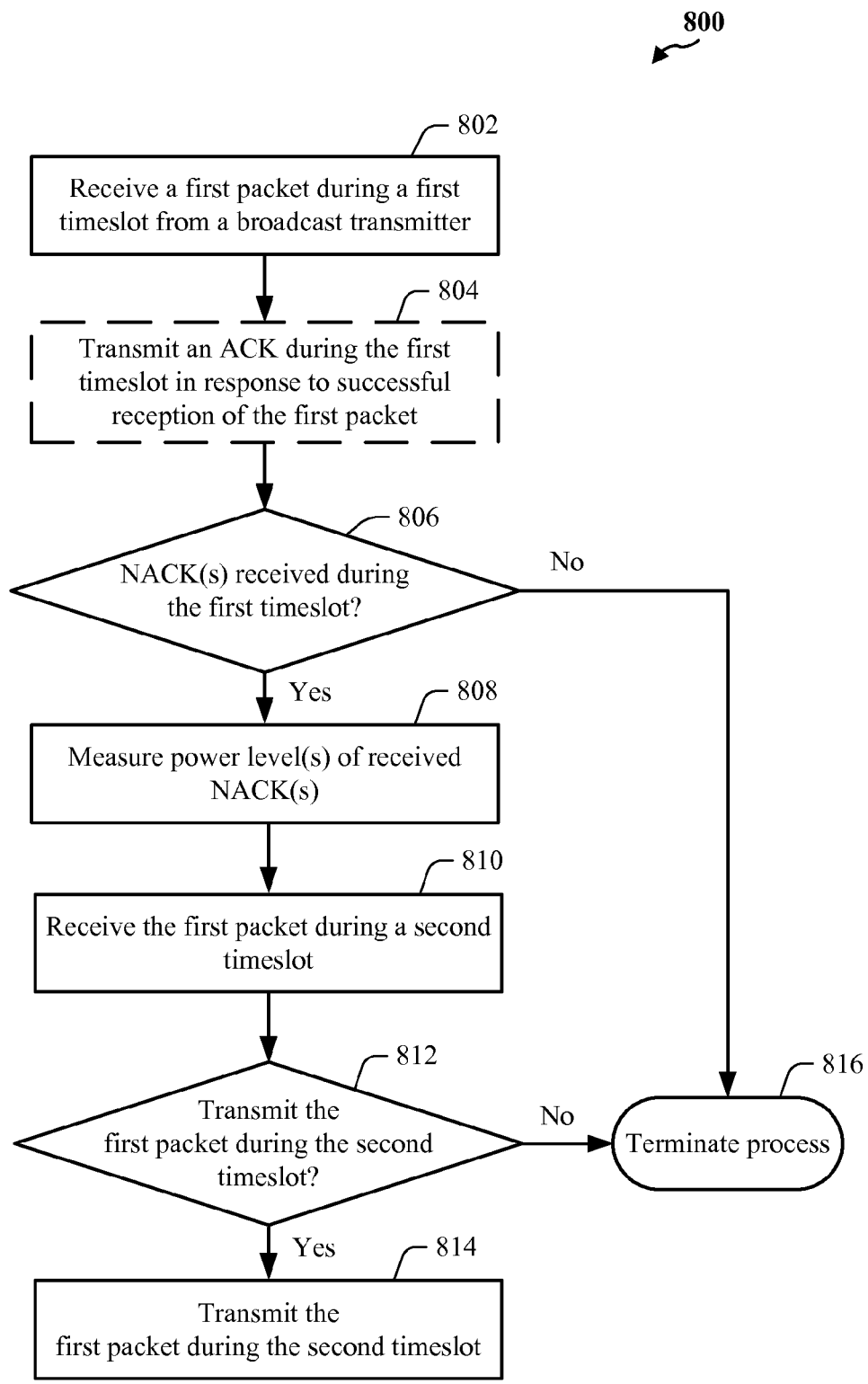
FIG. 8 is a flow chart of a first method of wireless communication.

FIG. 8 is a flowchart of a method 800 of wireless communication. The method may be performed by a UE (e.g., UE 704) in a broadcast D2D communication system (e.g., broadcast D2D communication system 700).

At block 802, the UE may receive a first packet during a first timeslot from a broadcast transmitter. Once a receiver UE in a broadcast session has successfully received a packet, it becomes a potential relay for that packet. For example, apparatus 902 may receive a first instance of a packet 920A using reception module 904, and may decode the packet using packet decoding module 906.

In an optional aspect, at block 804, the UE may transmit an ACK during the first timeslot to indicate successful reception of the first packet. For example, packet decoding module 906 may generate the ACK 922 upon successful decoding on the received first instance of the packet 920A, and may transmit the ACK 922 to the broadcasting UE 702 using transmission module 912.

At block 806, the UE may monitor for any NACKs received from one or more other receiver UEs in the broadcast D2D communication system. For example, apparatus 902 reception module 904 may monitor for any signals (e.g., NACKs, ACKs, etc.) 924 received from other receiver UEs 706, 708. If at block 806 no NACKs are received, then the process may terminate at block 816.

If at block 806, the UE receives one or more NACKs, then at block 808 the UE may measure a received power level of the NACKs. In an aspect, the UE may also measure power levels for any ACKs transmitted by one or more other receiver UEs in the broadcast D2D communication system. For example, signal(s) 924 received by reception module 904 may provide measurements of the received signal(s) 924 to NACK(s) power level measurement module 908. In such an example aspect, NACK(s) power level measurement module 908 may provide an indication 926 as to whether the received power level measurements for the signals 924 are above a threshold.

At block 810, the UE may receive the same packet (e.g., a second instance of the first packet) during a second timeslot. For example, apparatus 902 may receive the second instance of the packet 920B using reception module 904, and may decode the packet using packet decoding module 906.

At block 812, the UE may determine whether to act as a relay in the broadcast D2D communication system. The UE may act as a relay through transmission of the first packet during the second timeslot. The UE may determine whether to act as a relay based at least in part of the measured power levels from the received NACKs and/or ACKs. For example, where the NACK power is "low" (e.g., compared to a threshold), then the UE may not act as a relay for the first packet during the second timeslot. While where the measured NACK power is high, (e.g., compared to the threshold), then the UE may act as a relay for the first packet during the second timeslot (e.g., timeslot T+1). This received power (e.g., NACK, ACK, etc.) based decision allows the UE to determine when transmission of the first packet would be useful in the network. For example, a NACK from a nearby node may be received with a high power, thus making relaying at low power useful, which also does not cause much interference to the other nodes. In an example aspect, packet relay determination module 910 may receive the second instance of the packet 920 from packet decoding module 906 and the indication 926 from NACK(s) power level measurement module 908, and may determine whether the apparatus 902 is to act as a relay.

If at block 812, the UE determines that it will not act as a relay, then at block 816 the process may terminate at block 816.

If at block 812, the UE determines to act as a relay, then at block 814 the UE may transmit the first packet during the second timeslot. In an example aspect, where the apparatus 902 decides to act as a relay, packet relay determination module 910 may provide the second instance of the packet 920B to transmission module 912 for transmission during the second timeslot. In an aspect, the UE may act as a passive relay or an active relay. Where the UE acts as a passive relay, the packet is transmitted without sending a request to send (RTS) signal. Where the UE acts as an active relay, the UE may transmit a RTS signal. In such an aspect, the RTS signal may be sent on the same control resource as the original broadcast transmitter, or a different resource. Further, where the UE transmits the RTS, it may use the received power level from any cleat-to-send (CTS) messages it receives to assist in determining whether to act as a relay. Additionally, the transmit power used by the UE may be based at least in part of the measurements power levels (NACK, ACK, CTS, etc.). Further, the broadcast D2D communication system may allocate different priority levels to different members (e.g., UEs). In such an aspect, the relay UE may treat itself to be of the "lowest" priority and choose small enough transmit power so as not to cause too much interference to any of the other (unicast or broadcast or any other) links. Further, in such an aspect, the UE transmit power may be decided based on the CTS powers received and a comparison threshold. In another aspect, the relay UE can treat itself to be of the same priority as its own broadcast transmitter and choose a power that does not cause too much interference only to the higher priority communication links (e.g., the UE may cause interference to the lower priority links). In other words, the relay UE may select a priority value than can be the highest priority in the system, or any other value between the lowest and the highest depending upon the ACK/NACK, CTS powers, the original broadcast transmitter's priority, etc. Further, in such an aspect, the UE transmit power may be decided based on the CTS powers received and a comparison threshold.

Although the above discussion refers to only a first and a second timeslot, one of ordinary skill in the art would appreciate that the process may be performed wherever a packet transmission is repeated from one timeslot to the next.

Figure 9:
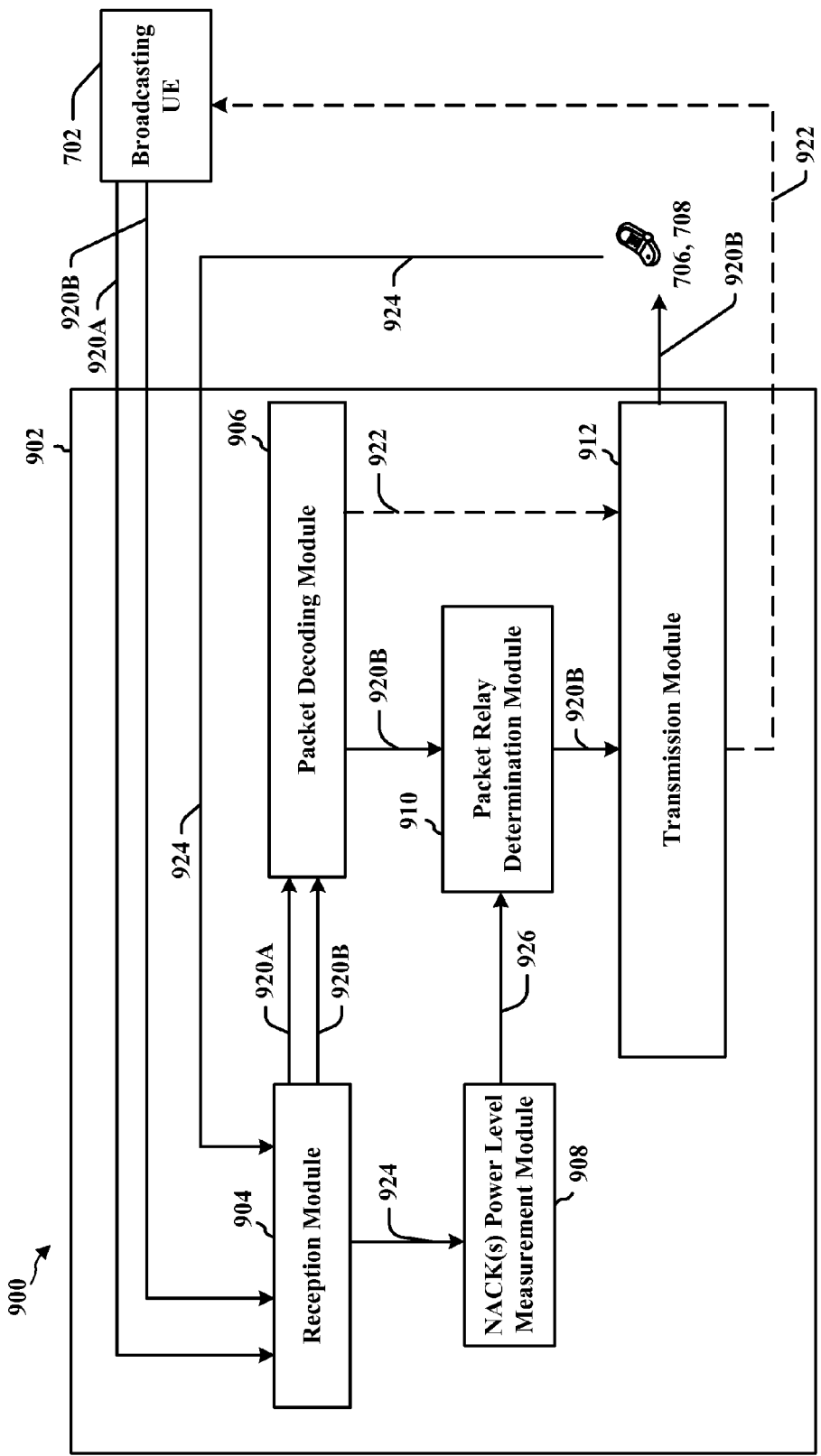
FIG. 9 is a conceptual data flow diagram illustrating the data flow between different modules/means/components in an exemplary apparatus.

FIG. 9 is a conceptual data flow diagram 900 illustrating the data flow between different modules/means/components in an example apparatus 902. The apparatus may be a UE (e.g., UE 704). As described with reference to FIG. 8 the apparatus 902 includes a reception module 904, packet decoding module 906, NACK(s) power level measurement module 908, packet relay determination module 910, and transmission module 912.

The apparatus may include additional modules that perform each of the steps of the algorithm in the aforementioned flow chart of FIG. 8. As such, each act/block in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
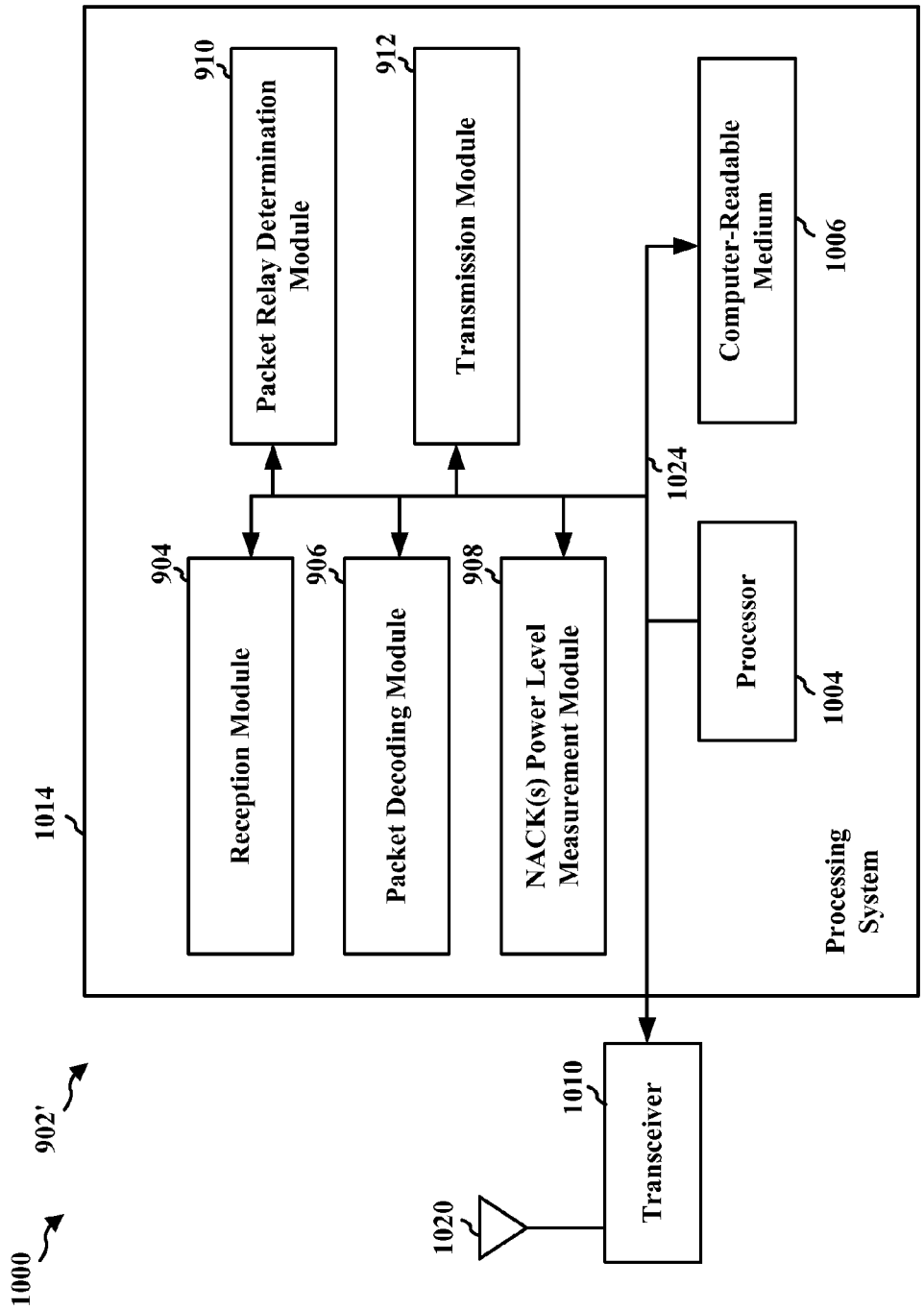
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, 910, and 912. The modules may be software modules running in the processor 1004, resident/stored in the computer-readable medium 1006, one or more hardware modules coupled to the processor 1004, or some combination thereof. The processing system 1014 may be a component of the UE 550 and may include the memory 560 and/or at least one of the TX processor 568, the RX processor 556, and the controller/processor 559.

In one configuration, the apparatus 902/902' for wireless communication includes means for receiving, by a first UE, a first packet during a first timeslot from a broadcast transmitter, means for measuring a power level of a NACK received during the first timeslot, means for receiving the first packet during a second timeslot, and means for determining whether to transmit the first packet during the second timeslot based on the measured power level of the NACK. In an aspect, the apparatus 902/902' means for determining may be further configured to determine that the measured power level of the NACK is above a threshold power level. In such an aspect, the apparatus 902/902' may include means for transmitting the first packet during the second timeslot. In an aspect, the apparatus 902/902' means for measuring may be further configured to measure a power level of a received ACK. In such an aspect, the apparatus 902/902' means for determining may be further configured to determine whether to transmit the first packet during the second timeslot also based on the measured power level of the ACK. In an aspect, the apparatus 902/902' means for transmitting may be further configured to transmit a RTS with the first packet during the second timeslot. In an aspect, the apparatus 902/902' may include means for transmitting an ACK during the first timeslot in response to successful reception of the first packet.

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 568, the RX Processor 556, and the controller/processor 559. As such, in one configuration, the aforementioned means may be the TX Processor 568, the RX Processor 556, and the controller/processor 559 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
   receiving, by a user equipment (UE), a first packet during a first timeslot from a broadcast transmitter;
   measuring a power level of a negative acknowledgement (NACK) received during the first timeslot;
   receiving the first packet during a second timeslot;
   determining, in response to receiving the first packet during the second time slot, whether to transmit the first packet during the second timeslot based on the measured power level of the NACK; and
   transmitting, in response to determining that the measured power level of the NACK is above a threshold power level, the first packet using a transmit power level that is based on a priority associated with the UE.

2. The method of claim 1, wherein the measuring further comprises:
   measuring a power level of a received acknowledgement (ACK), and wherein the determination is further based on the measured power level of the ACK.

3. The method of claim 1, wherein the UE is configured as a lowest priority UE when acting as a relay, and wherein the transmit power level for the transmission is selected based on the lowest priority configuration so that the UE may not cause interference with any receivers in a system.

4. The method of claim 1, wherein the UE is configured as an equivalent priority to the broadcast transmitter, and wherein the transmit power level for the transmission is selected based on the equivalent priority configuration so that the UE may not cause interference to any higher-priority receivers in a system.

5. The method of claim 1, wherein the transmitting further comprises transmitting a request-to-send (RTS) with the first packet during the second timeslot.

6. The method of claim 5, wherein the RTS is transmitted by the UE using a control resource used by the broadcast transmitter to transmit a RTS.

7. The method of claim 5, wherein the RTS is transmitted by the UE using a different control resource than a control resource used by the broadcast transmitter to transmit a RTS.

8. The method of claim 5, wherein a transmit power used to transmit the first packet is further based on a clear-to-send (CTS) received power.

9. The method of claim 1, further comprising:
   transmitting an ACK during the first timeslot in response to successful reception of the first packet.

10. The method of claim 1, further comprising:
    refraining from transmitting the first packet in response to determining that the measured power level of the NACK is not above a threshold power level.

11. An apparatus for communication, comprising:
    means for receiving, by a user equipment (UE), a first packet during a first timeslot from a broadcast transmitter;
    means for measuring a power level of a negative acknowledgement (NACK) received during the first timeslot;
    wherein the means for receiving are further configured to receive the first packet during a second timeslot;
    means for determining, in response to receiving the first packet during the second time slot, whether to transmit the first packet during the second timeslot based on the measured power level of the NACK; and
    means for transmitting, in response to determining that the measured power level of the NACK is above a threshold power level, the first packet during the second timeslot using a transmit power level that is based on a priority associated with the UE.

12. The apparatus of claim 11, wherein the means for measuring are further configured to:
    measure a power level of a received acknowledgement (ACK), and wherein the determination is further based on the measured power level of the ACK.

13. The apparatus of claim 11, wherein the UE is configured as a lowest priority UE when acting as a relay, and wherein the transmit power level for the transmission is selected based on the lowest priority configuration so that the UE may not cause interference with any receivers in a system.

14. The apparatus of claim 11, wherein the UE is configured as an equivalent priority to the broadcast transmitter, and wherein the transmit power level for the transmission is selected based on the equivalent priority configuration so that the UE may not cause interference to any higher-priority receivers in a system.

15. The apparatus of claim 11, wherein the means for transmitting are further configured to transmit a request-to-send (RTS) with the first packet during the second timeslot.

16. The apparatus of claim 15, wherein the RTS is transmitted by the UE using a control resource used by the broadcast transmitter to transmit a RTS.

17. The apparatus of claim 15, wherein the RTS is transmitted by the UE using a different control resource than a control resource used by the broadcast transmitter to transmit a RTS.

18. The apparatus of claim 15, wherein a transmit power used to transmit the first packet is further based on a clear-to-send (CTS) received power.

19. The apparatus of claim 11, further comprising:
means for transmitting an ACK during the first timeslot in response to successful reception of the first packet.

20. The apparatus of claim 11, further comprising:
means for refraining from transmitting the first packet in response to determining that the measured power level of the NACK is not above a threshold power level.

21. An apparatus for communication, comprising:
a memory; and
at least one processor coupled to the memory and configured to:
receive, by a user equipment (UE), a first packet during a first timeslot from a broadcast transmitter;
measure a power level of a negative acknowledgement (NACK) received during the first timeslot;
receive the first packet during a second timeslot;
determine, in response to receiving the first packet during the second time slot, whether to transmit the first packet during the second timeslot based on the measured power level of the NACK; and
transmit, in response to a determination that the measured power level of the NACK is above a threshold power level, the first packet during the second timeslot using a transmit power level that is based on a priority associated with the UE.

22. The apparatus of claim 21, wherein the at least one processor is further configured to:
measure a power level of a received acknowledgement (ACK); and
determine whether to transmit the first packet during the second timeslot further based on the measured power level of the ACK.

23. The apparatus of claim 21, wherein the UE is configured as a lowest priority UE when acting as a relay, and wherein the at least one processor is further configured to transmit at the transmit power level that is selected based on the lowest priority configuration so that the UE may not cause interference with any receivers in a system.

24. The apparatus of claim 21, wherein the UE is configured as an equivalent priority to the broadcast transmitter, and wherein the at least one processor is further configured to transmit at the transmit power level that is selected based on the equivalent priority configuration so that the UE may not cause interference to any higher-priority receivers in a system.

25. The apparatus of claim 21, wherein the at least one processor is further configured to transmit a request-to-send (RTS) with the first packet during the second timeslot.

26. The apparatus of claim 25, wherein the at least one processor is further configured to transmit the RTS using a control resource used by the broadcast transmitter to transmit a RTS.

27. The apparatus of claim 25, wherein the at least one processor is further configured to transmit the RTS using a different control resource than a control resource used by the broadcast transmitter to transmit a RTS.

28. The apparatus of claim 25, wherein a transmit power used to transmit the first packet is further based on a clear-to-send (CTS) received power.

29. The apparatus of claim 21, wherein the at least one processor is further configured to:
transmit an ACK during the first timeslot in response to successful reception of the first packet.

30. The apparatus of claim 21, the processing system further configured to:
refrain from transmitting the first packet in response to determining that the measured power level of the NACK is not above a threshold power level.

31. A non-transitory computer-readable medium storing computer executable code for wireless communication, comprising code for:
receiving, by a user equipment (UE), a first packet during a first timeslot from a broadcast transmitter;
measuring a power level of a negative acknowledgement (NACK) received during the first timeslot;
receiving the first packet during a second timeslot;
determining, in response to receiving the first packet during the second time slot, whether to transmit the first packet during the second timeslot based on the measured power level of the NACK; and
transmitting, in response to determining that the measured power level of the NACK is above a threshold power level, the first packet during the second timeslot using a transmit power level that is based on a priority associated with the UE.

32. The non-transitory computer-readable medium of claim 31, further comprising code for:
measuring a power level of a received acknowledgement (ACK), and wherein the determination is further based on the measured power level of the ACK.

33. The non-transitory computer-readable medium of claim 31, wherein the UE is configured as a lowest priority UE when acting as a relay, and wherein the transmit power level for the transmission is selected based on the lowest priority configuration so that the UE may not cause interference with any receivers in a system.

34. The non-transitory computer-readable medium of claim 31, wherein the UE is configured as an equivalent priority to the broadcast transmitter, and wherein the transmit power level for the transmission is selected based on the equivalent priority configuration so that the UE may not cause interference to any higher-priority receivers in a system.

35. The non-transitory computer-readable medium of claim 31, further comprising code for transmitting a request-to-send (RTS) with the first packet during the second timeslot.

36. The non-transitory computer-readable medium of claim 35, wherein the RTS is transmitted by the UE using a control resource used by the broadcast transmitter to transmit a RTS.

37. The non-transitory computer-readable medium of claim 35, wherein the RTS is transmitted by the UE using a different control resource than a control resource used by the broadcast transmitter to transmit a RTS.

38. The non-transitory computer-readable medium of claim 35, wherein a transmit power used to transmit the first packet is further based on a clear-to-send (CTS) received power.

39. The non-transitory computer-readable medium of claim 31, further comprising code for:
transmitting an ACK during the first timeslot in response to successful reception of the first packet.

40. The non-transitory computer-readable medium of claim 31, further comprising code for:
  refraining from transmitting the first packet in response to determining that the measured power level of the NACK is not above a threshold power level.

* * * * *